2,788,630
NUT GRABBER

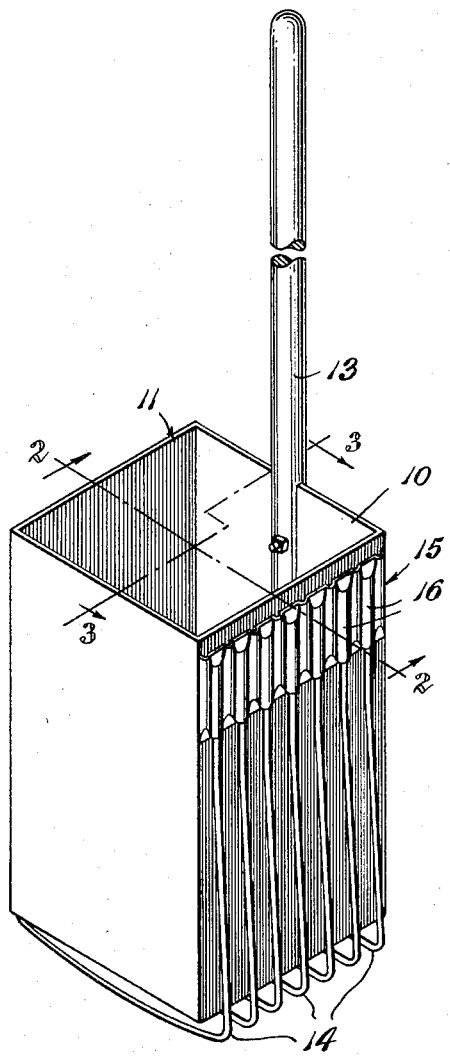
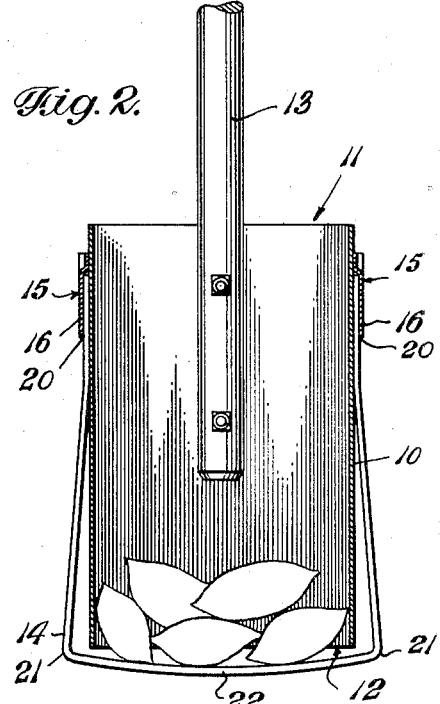
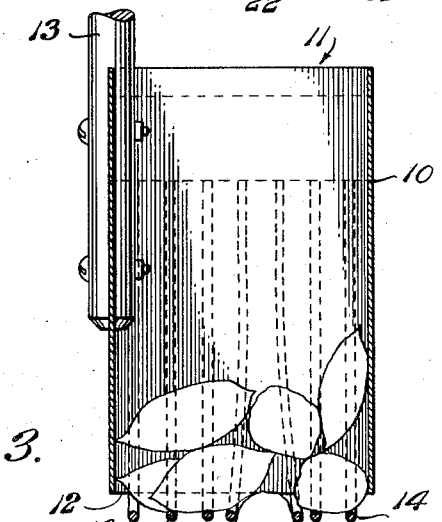
Fig. 1.
Fig. 2.
Fig. 3.
INVENTOR
Walker R. Nisbet,
BY
ATTORNEY United States Patent Office 2,788,630
Patented Apr. 16, 1957

Walker R. Nisbet, San Angelo, Tex.

Application December 15, 1953, Serial No. 398,380

6 Claims. (Cl. 56—328)

The invention relates to a device for picking up nuts and other objects from the ground. As is well known this is normally a slow and laborious operation, necessitating stooping on the part of the picker and picking up the nuts or other objects one at a time.

In accordance with my invention an open bottomed box or container is employed which is equipped with a suitable handle and a series of spaced flexible U-shaped spring wires which are attached at their upper ends to the sides of the box and which extend downwardly from their supported portions and thence transversely across the otherwise open end of the box or container.

Devices intended for similar purposes have been proposed but in such devices grids of spring material have in general been provided extending across the bottom portion only of the container and these devices are unsatisfactory since the size of the articles which may be picked up is limited, and in addition relatively fine wires or the like had to be employed in the grid to provide sufficient resiliency.

It is an object of the present invention to provide a device for picking up nuts or the like in which objects of widely different sizes may be picked up, and in which the grid will withstand heavy hammering against the ground when in actual use.

The invention will be more readily understood by reference to the accompanying drawings and the following detailed description, in which a specific embodiment of the invention is set forth by way of illustration rather than by way of limitation.

In the drawings:

Fig. 1 is a perspective view of a device for picking up nuts embodying my invention;

Fig. 2 is a vertical sectional view taken substantially along line 2—2 of Fig. 1; and Fig. 3 is a vertical section taken substantially along line 3—3 of Fig. 1.

Referring to the drawings reference numeral 10 denotes a suitable tubular box or container shown as open at its top 11 and bottom 12. The box may be made of any suitable material, as for example sheet metal, and its size and shape may be varied as desired. A handle 13 is provided herein shown as secured to one of the side walls of the box by bolts or other suitable fastening means. The handle is of sufficient length so that the bottom of the box may be brought into contact with the ground while the top of the handle is grasped by an operator.

In accordance with may invention the picking grid for the box comprises a series of equally spaced parallel U-shaped spring pick up elements 14, each being secured adjacent its upper ends to opposite sides of the box at a suitable distance above the open bottom of the box. As shown a pair of corrugated strips 15 are provided on opposite sides of the box and secured thereto in any suitable manner, as by welding, riveting or the like, each strip being provided with a series of grooved portions 16 into which the upper portions of the upright resilient legs of the U-shaped pick up members 14 are tightly fitted and preferably secured as by welding or in any suitable manner.

As shown the effective length of the upright resilient legs of the pick up members 14 is from a point 20 at the bottom of the corrugated holding strip 15 to a point 21 where the bend of the U commences. This provides sufficient deflection for the transverse pick up portions 22 of the pick up elements to permit nuts or other object of widely varying sizes to be readily picked up without injury to the picking elements. Moreover, the ample leverage provided by this arrangement permits use of heavier and more rugged spring wire than is possible where pick up springs extend across the bottom only of the box or container.

As is apparent from Fig. 2 the legs of the pick up elements flare outwardly from their upper points of attachment to the lower transverse portions, whereby frictional contact with the box is avoided. The picking operation will be largely apparent from the foregoing description and from a consideration of the drawings. When it is desired to pick up an object such as a pecan nut lying on the ground the picking device is lowered upon such nut as indicated in Fig. 3, and on continued downward pressure the respective members of a pair of spring elements are forced apart or deflected allowing the nut to pass therethrough. As soon as the nut has passed the pair of spring elements such elements readily return to their original position by spring action. It will be apparent that by using the present device a number of nuts may be picked up at the same time.

The invention has been described in detail for the purpose of illustration but it will be obvious that numerous modifications and variations may be resorted to without departing from the spirit of the invention.

I claim:

1. A device for picking up nuts and the like from the ground, comprising a tubular container open at the bottom and provided with a handle portion, and a series of parallel U-shaped pick up elements each having resilient upright leg portions secured to opposite sides of the container, and transverse portions connecting the lower ends of the leg portions and extending across the bottom of the container, whereby upon application of a downward pressure upon the handle nuts or like objects of suitable size will pass between adjacent transverse portions of the pick up elements into the interior of the container, and will be retained in the container by the grid formed by the series of spring pick up elements, the transverse portions of the pick up elements being of sufficient thickness so that deflection takes place principally in the upright leg portions rather than in the transverse portions of said elements during the nut picking up operation.

2. A device as set forth in claim 1, wherein means are provided for clamping the legs of the pick up units to the sides of the container, said means comprising corrugated strips secured to opposite sides of the container at a substantial distance from the bottom thereof, said strips having grooved portions into which the upper portions of said legs are fitted.

3. A nut picking device as set forth in claim 1, wherein the resilient leg portions are at least as long as the transverse portions of the pick up elements.

4. A nut picking device as set forth in claim 1, wherein the transverse portions of the pick up elements are sufficiently long to permit picking up a number of nuts at one time between the members of one pair of pick up elements.

5. A nut picking device as set forth in claim 1, wherein the leg portions of the pick up elements flare outwardly from the tubular receptacle at the lower portion thereof, whereby frictional contact therewith is avoided.

6. A nut picking device as set forth in claim 1, wherein there are a plurality of pairs of U-shaped pick up elements whereby a plurality of nuts may be picked up at one time.

References Cited in the file of this patent

UNITED STATES PATENTS

| | | |
|---|---|---|
| 1,298,923 | Franke | Apr. 1, 1909 |
| 2,540,857 | Bagley | Feb. 6, 1951 |